United States Patent [19]
Michael et al.

[11] Patent Number: 5,933,479
[45] Date of Patent: Aug. 3, 1999

[54] REMOTE SERVICE SYSTEM

[75] Inventors: Howard W. Michael, Long Grove; Earl M. Hellum, Evanston, both of Ill.

[73] Assignee: Toyoda Machinery USA Corp., Arlington Heights, Ill.

[21] Appl. No.: 09/177,425

[22] Filed: Oct. 22, 1998

[51] Int. Cl.⁶ .................................................. H04M 11/00
[52] U.S. Cl. .......................... 379/110.01; 348/14; 379/21
[58] Field of Search ..................... 348/14–20; 379/90.01, 379/93.01, 93.05–93.08, 93.17, 93.23, 110.01, 21

[56]         References Cited

U.S. PATENT DOCUMENTS

| | | | |
|---|---|---|---|
| 5,528,285 | 6/1996 | Morikawa et al. | 348/14 |
| 5,760,824 | 6/1998 | Hicks, III | 348/14 |

FOREIGN PATENT DOCUMENTS

| | | | |
|---|---|---|---|
| 6-141308 | 5/1994 | Japan | 348/14 |

*Primary Examiner*—Wing F. Chan
*Attorney, Agent, or Firm*—Wood, Phillips, VanSanten, Clark & Mortimer

[57]             ABSTRACT

A remote service system provides reduced down time of serviced equipment, provides quicker service availability, and provides more experienced service technicians virtually on site. By using high tech video links over conventional phone lines, utilizing two-way wireless audio and visual communication in real time, technicians at a central site can see exactly what the customer's maintenance person is seeing. This allows an untrained technician or someone unfamiliar with the device to be the eyes, ears and hands of the technician at the central site. The maintenance person can then be talked through the steps of the repair process. This enhances the capabilities of existing personnel, thus reducing labor costs, service calls, and down time.

15 Claims, 5 Drawing Sheets

REMOTE SERVICE SYSTEM

FIELD OF THE INVENTION

This invention relates to remote service systems and, more particularly, to a system using two way wireless audio and visual communication.

BACKGROUND OF THE INVENTION

On site service of equipment is often necessary to reduce downtime of the equipment. Difficulties in on-site service may arise due to lack of availability of skilled technicians. Even with skilled technicians it is difficult for a network of technicians to all have vast familiarity with all aspects of a device to be serviced.

When a field service technician encounters a unique problem that cannot be readily resolved in the field, the technician may telephone a more experienced person at a central site. The more experienced person may be, for example, a more experienced service technician or an engineer who had actually developed the equipment. This communication is traditionally established via wireline telephone connection. However, this type of connection requires that telephone service be available immediately proximate the equipment. Otherwise, the field service technician must go back and forth between the equipment to be serviced and the telephone. With present cellular technology, the field service technician might communication via cellular telephone. However, depending on the specific location of the equipment, cellular telephone transmission might prove difficult or not possible.

With telephonic communication the central service technician is relying on audio communication with the field service technician to diagnose the problem. This may be less than ideal, as under some circumstances the field service technician cannot accurately describe the condition of the equipment. This can make the servicing more difficult.

The present invention is directed to overcoming one or more of the problems discussed above in a novel and simple manner.

SUMMARY OF THE INVENTION

Broadly, there is disclosed herein a remote service system for communicating via telephone with a central service site utilizing two-way wireless audio and visual communication. The remote service system includes a service unit and a base unit. The service unit includes a video camera, an audio speaker and a microphone adapted to be worn by a user at a remote service site. A harness to be worn by the user supports first local communication means coupled to the video camera, the audio speaker and the microphone for communicating audio and video via wireless signals. A battery on the harness powers the camera and the first communication means. The base unit is positioned in proximity of the service unit, relative to the central service site. The base unit includes a housing supporting second local communication means for communicating audio and video via wireless signals with the service unit. A video conference interface unit is coupled to the second local communication means for converting audio and video signals for transmission via a telephone line to the central service site.

It is a feature of the invention that the service unit comprises a user headset including the audio speaker and the microphone. The headset includes noise abatement earpieces.

It is another feature of the invention that the video camera is mounted to the headset.

It is a further feature of the invention that the battery is connected to the camera and the first local communication means with voltage regulators.

It is still a further feature of the invention that the first local communication means comprises a video transmitter and the second local communication means comprises a video receiver. The base unit includes three antennas connected to the video receiver. A mast telescopically mounts the three antenna to the base unit housing.

It is an additional feature of the invention that the first and second local communication means comprise a wireless intercom system.

It is yet an additional feature of the invention that the video conference interface unit communicates with the central service site via ISDN lines. More particularly, the video conference interface unit communicates with the central service site via three ISDN lines.

It is still yet an additional feature of the invention that the base unit further comprises a video monitor coupled to the video conference interface unit.

It is yet another feature of the invention that the video conference interface unit compresses video and audio to the telephone lines.

It is still another feature of the invention that the base unit includes external connectors on the housing for connecting the video conference interface unit to local audio and video devices.

More particularly, the remote service system provides reduced down time of serviced equipment, provides quicker service availability, and provides more experienced service technicians virtually on site. By using high tech video links over conventional phone lines, utilizing two-way wireless audio and visual communication in real time, technicians at a central site can see exactly what the customer's maintenance person is seeing. This allows an untrained technician or someone unfamiliar with the device to be the eyes, ears and hands of the technician at the central site. The maintenance person can then be talked through the steps of the repair process. This enhances the capabilities of existing personnel, thus reducing labor costs, service calls, and down time.

Further features and advantages of the invention will be readily apparent from the specification and from the drawing.

DETAILED DESCRIPTION OF THE INVENTION

Figure 1:
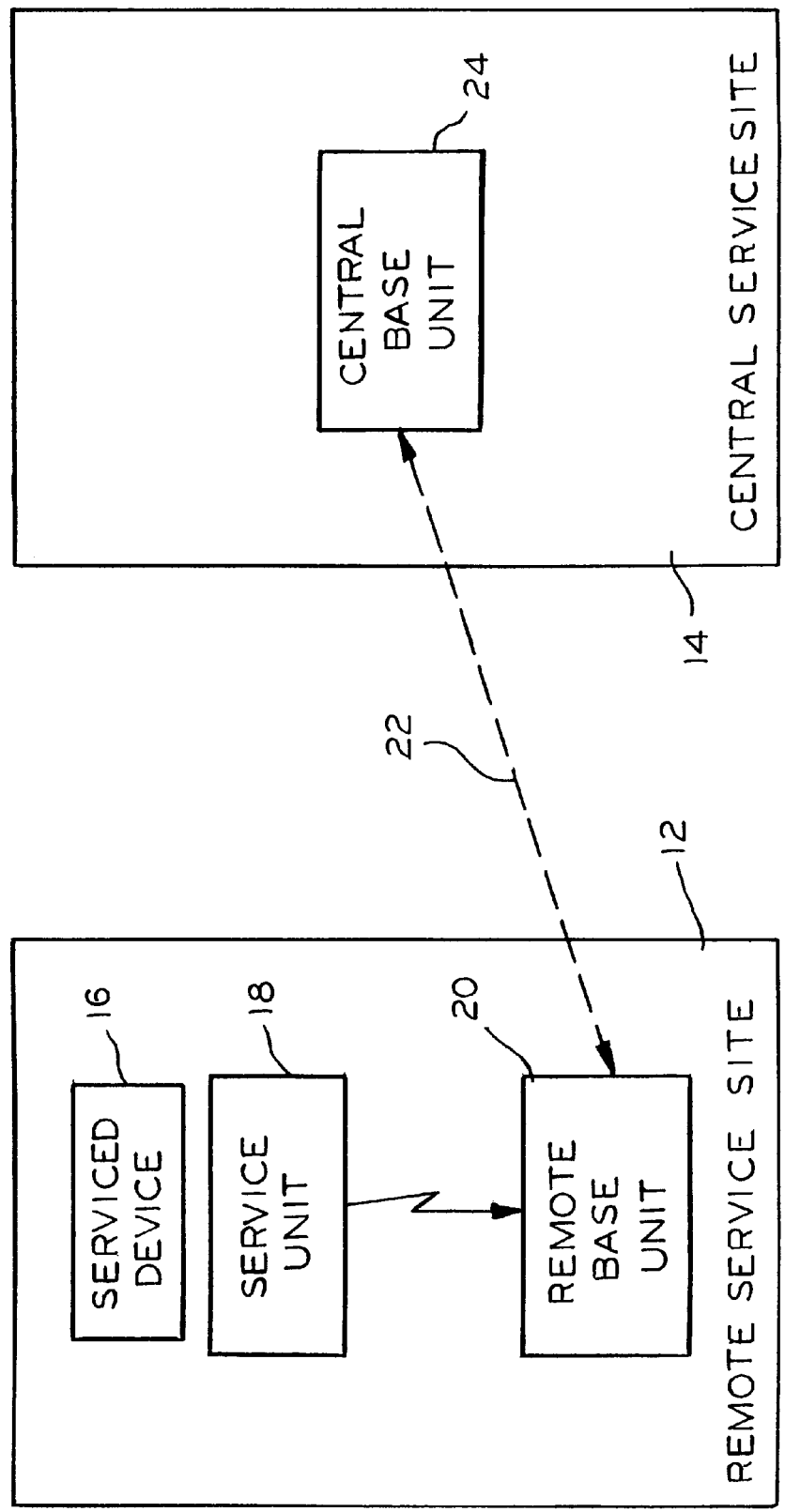
FIG. 1 is a generalized block diagram of a remote service system for communicating via telephone with a central service site according to the invention.

Referring to FIG. 1, a block diagram illustrates a remote service system 10 for communicating via telephone from a remote service site 12 to a central service site 14. Particularly, the remote service system 10 is adapted to be used for servicing a serviced device 16 located at the remote service site 12 by a user such as a field maintenance person or service technician located at the remote service site 12.

In accordance with the invention, the remote service system 10 includes a service unit 18 to be worn by the user which communicates via two-way wireless audio and visual communication with a remote base unit 20. The remote base unit 20 in turn communicates via telephone line, represented at 22, with a central base unit 24 at the central service site. As will be appreciated, a more experienced technician, engineer or the like will be located at the central base unit 24 for instructing the field service technician on how to service the device 16. The field service technician using the two-way wireless audio and visual communication can act as the eyes, ears and hands of the technician at the central service site, as will be apparent.

Figure 2:
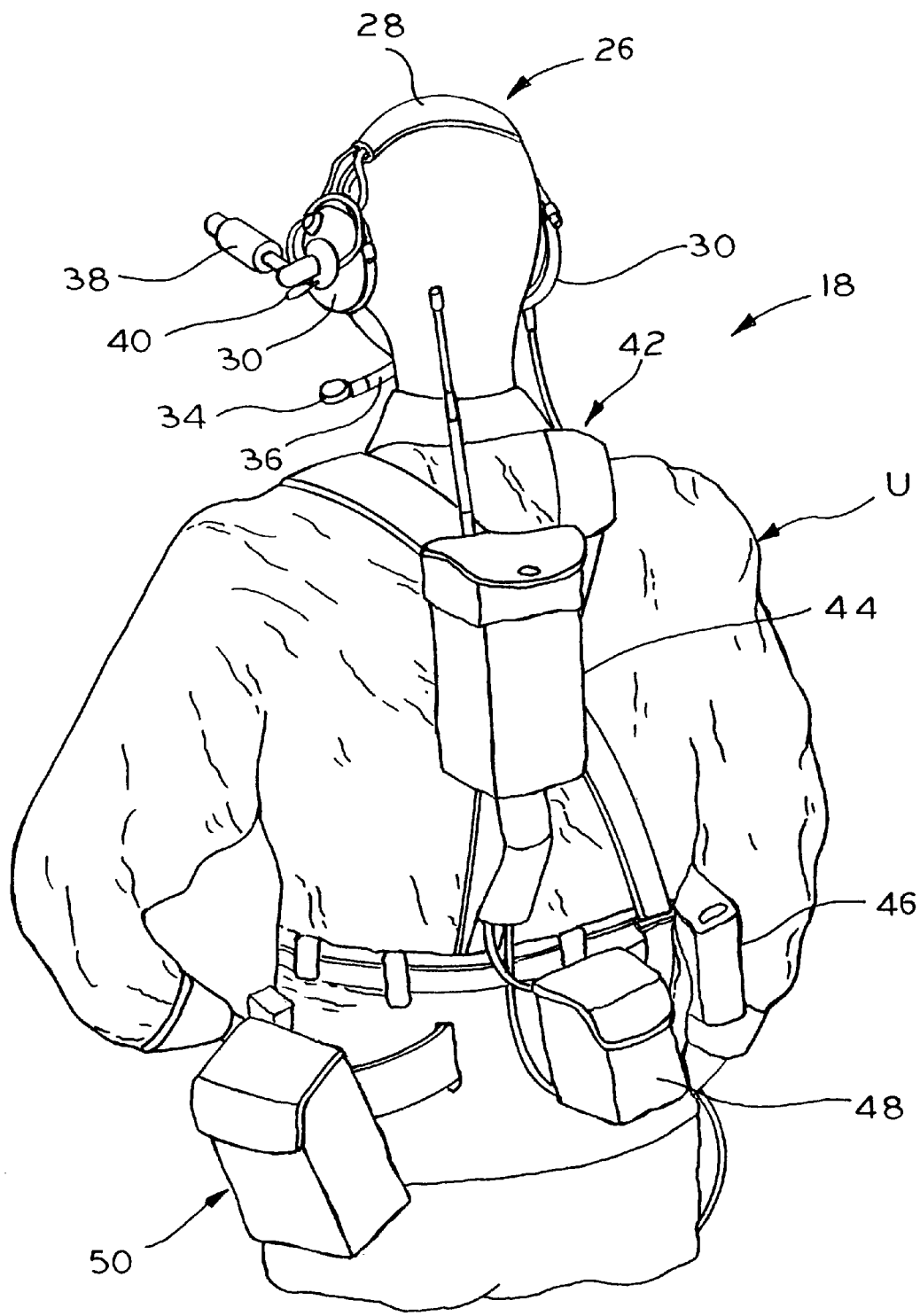
FIG. 2 is a perspective view illustrating a user wearing a service unit of the remote service system of FIG. 1.

Referring to FIG. 2, the service unit 18 is illustrated worn by a user U. A block diagram of the service unit 18 is illustrated in FIG. 3.

The service unit 18 includes a headset assembly 26. The headset assembly 26 includes an arcuate, adjustable band 28 supporting opposite noise abatement earpieces 30 in a conventional manner. Each earpiece 30 houses an audio speaker 32, as shown in FIG. 3. A microphone 34 is connected to the headset assembly 26 via a support arm 36 in the conventional manner. A color, weather-resistant tube video camera 38 is mounted to one of the earpieces 30 using a camera mount 40. The mount 40 allows the camera position to be adjusted so that it receives an image of what the service technician U is seeing.

The service unit 18 includes a harness 42 to be worn by the user U and supporting a video transmitter 44, a full duplex intercom 46, a voltage regulator assembly 48, and a battery pack 50. Each of the video transmitter 44, intercom 46, regulator assembly 48 and battery pack 50 is mounted in one of plural pouches on the harness 42, as is particularly illustrated in FIG. 2. As is apparent, the particular configuration of the harness 42 is for an exemplary embodiment of the invention. Any appropriate harness might be utilized for the convenience and comfort of a field service technician. Utilizing a harness 42 such as shown permits the field service technician to freely move about without concern for cable connections or the like.

Figure 3:
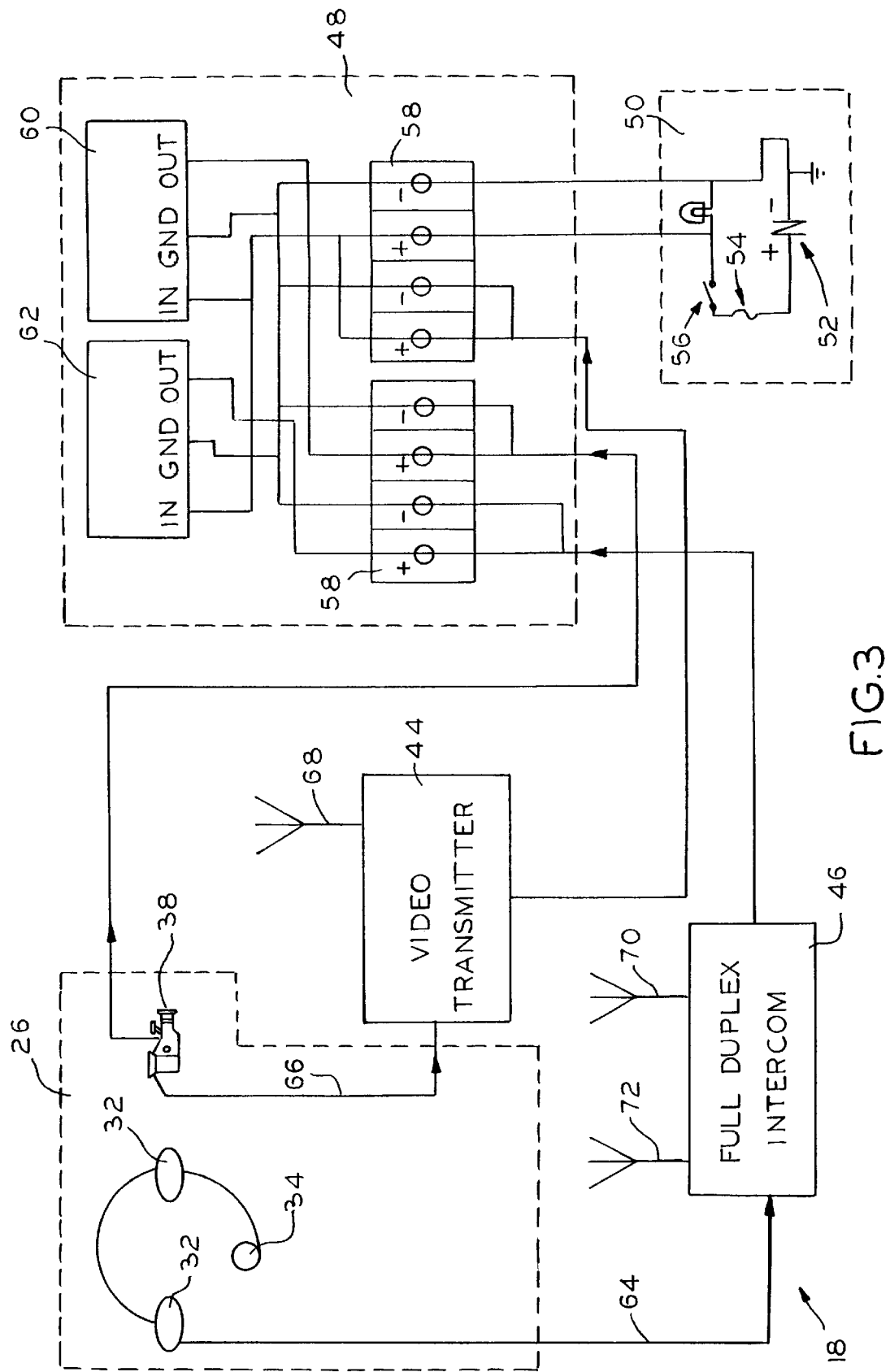
FIG. 3 is a block diagram of the service unit of FIG. 2.

Referring particularly to FIG. 3, the battery pack 50 includes a battery 52, such as lithium ion batteries, connected via a fuse 54 and on/off switch 56 to the regulator assembly 48. The regulator assembly 48 includes terminal block 58. The terminal block 58 provides for quick service of the service unit 18 should that be necessary. It also provides for connection to multiple devices, as described below.

The service unit 18 is powered by a single battery 52 to provide power to all the devices on the harness 42 for six and a half to seven hours of use. The harness 42 weighs approximately 6.5 pounds.

The battery pack 50 is connected to a ten volt voltage regulator 60 and an eight volt voltage regulator 62 in the voltage regulator assembly 48. The regulator 60 supplies regulated DC power to the video camera 38 and the video transmitter 44. The voltage regulator 62 provides regulator power to the intercom 46. The intercom 46 is connected via a wiring harness 64 to the audio speakers 32 and microphone 34. The video transmitter 44 is connected via a wiring harness 66 to the video camera 38.

The video transmitter 44 is adapted to transmit a wireless video signal via an antenna 68 to the remote base unit 20. The intercom 46 is adapted to transmit audio information to the base unit 20 via an antenna 70 and receive audio signals from the base unit 20 via an antenna 72.

Figure 4:
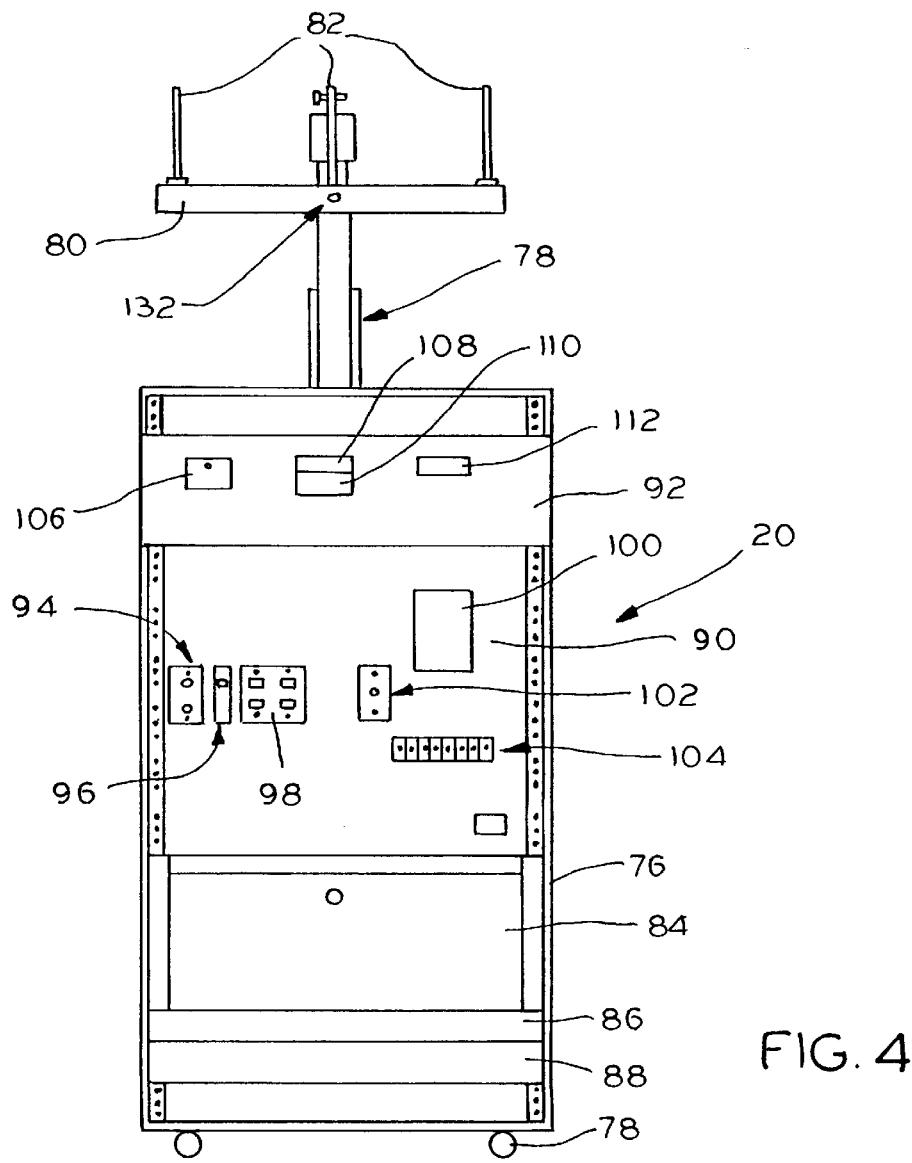
FIG. 4 is an elevation view of a remote base unit of the remote service system of FIG. 1.
Figure 5:
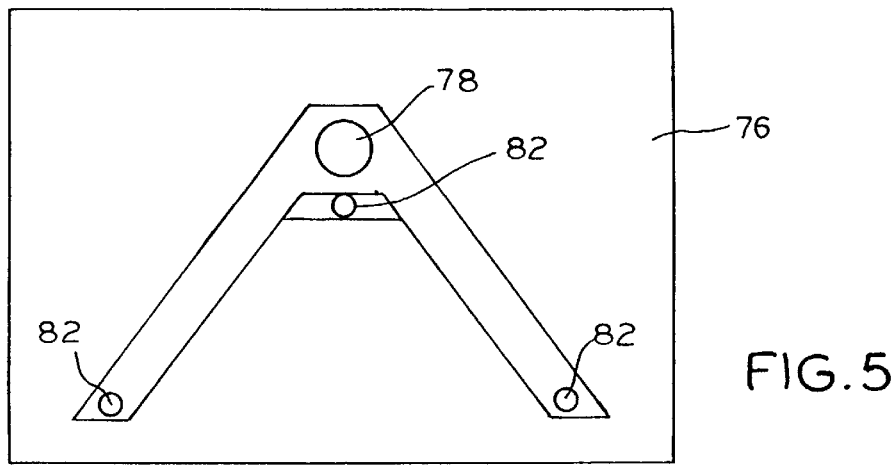
FIG. 5 is a top view of the base unit of FIG. 4.
Figure 6:
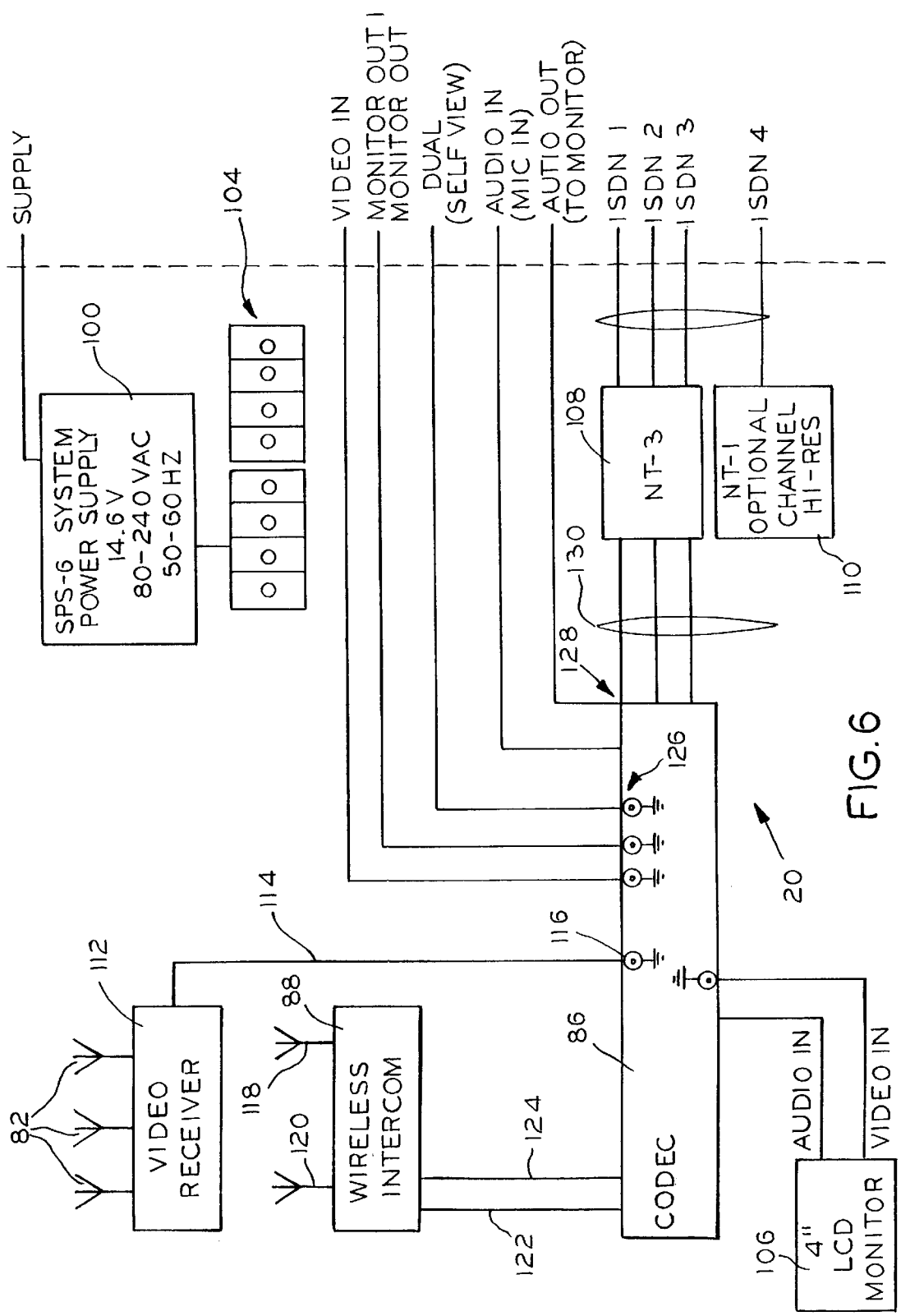
FIG. 6 is a block diagram of the base unit of FIG. 4.

Referring to FIGS. 4–6, the base unit 20 is illustrated. Particularly, FIGS. 4 and 5 illustrate structure of the base unit 20, while FIG. 6 illustrates an electrical block diagram.

The base unit 20 includes a housing 76. The housing 76 comprises a cabinet adapted to meet NEMA 13R standards to provide protection from water, oils and vapors and is mounted on wheels 78 to be transported about the service site 12.

A telescoping mount 78 is mounted atop the housing 76. An antenna mount 80 is mounted atop the telescoping mount 78. The antenna mount 80 supports three video antennas 82.

Mounted within the cabinet 78 is a storage drawer 84, a Codec or a video conference interface unit 86, a wireless intercom 88, a control panel 90, and an interface panel 92. The control panel 90 includes audio in and out terminal connectors 94, a circuit breaker 96, AC outlets 98, a voltage regulator 100, an RS232 connector 102, and terminal blocks 104. The interface panel 92 includes a four inch LCD monitor 106, telephone connectors 108 and 110, and a video receiver 112.

The principal component of the base unit 20 is the video conference interface unit, or Codec, 86. In the illustrated embodiment of the invention, the Codec 86 comprises a Tandberg Vision 5000 remote video conferencing unit. The Codec 86 compresses video, audio and data for communication via telephone line, as described more particularly below.

The three antenna 82 are connected to the video receiver 112. The telescoping mount 78 telescopes up from the housing 76 to a height of approximately ten feet to provide coverage of the area near the base unit 20. The video receiver 112 uses a diversity method to reduce secondary reflected signals. Particularly, the video receiver 112 is typically part of a matched pair with the service unit video transmitter 44. The video receiver 112 develops video output on a line 114 to a video input port 116 of the Codec 86.

The wireless intercom 88 includes a first antenna 118 for transmitting audio signals and a second antenna 120 for receiving audio signals. Particularly, the wireless intercom 88 provides two-way audio communication with the intercom 46 of the service unit 18. As above, the wireless intercom units 46 and 88 are adapted to be a matched pair. The wireless intercom 88 is connected via an audio out line 122 and an audio in line 124 with the Codec 86.

The voltage regulator 100 is connected to a conventional AC supply and provides appropriate power for the various devices. The connections are not illustrated herein as they are conventional in nature. The connections are provided via the terminal blocks 104. The Codec 86 includes video terminals 126 providing external connections for video in and video out for an external camera and remote and self view to use the unit in a classroom for remote training. Audio connections 128 are provided for attachment to a TV monitor audio and audio in for attachment to an external microphone.

The Codec 86 has four ISDN output terminals connected via an ST interface 130 to a three port NT-3 block 108 and a single port NT-1 block 110 for direct connection to up to four ISDN lines. The combined bandwidth of three ISDN lines is 384 kilobytes, which allows thirty frame per second video and full duplex audio as well as full duplex RS232 data. The RS232 data at the connector 102 provide means to attach the unit being serviced for additional diagnostics. The Codec 86 has ability for use of a fourth ISDN channel that can be added to provide even higher resolution.

As is apparent, other types of video conferencing systems could be used. Any such systems could communicate via any type of telephone line, including cellular lines, based on available technology.

The four inch LCD monitor 106 is connected to audio and video ports of the Codec 86 for viewing the video information received by the video receiver 112.

The Codec 86 uses an infrared remote control. In accordance with the invention, an external IR receiver 132 is mounted to the antenna mount 80, see FIG. 4.

When the system is set up, the service technician can view the LCD monitor 106 to view operation of the camera 38 so any adjustment can be done at that time. Using the infrared remote of the Codec 86, the service technician starts a call by pressing a send button on the remote. The service technician is then connected automatically to technical support personnel at the central service site. A full menu is available on the LCD monitor for setup and testing of the unit, as is conventional with the Codec 86.

Once communication is established with the central base unit 24, the service technician can then move to the serviced device 16 and perform the necessary service under the guidance of the central service site 14. Thus, the remote service system 10 provides reduced down time of serviced equipment, provides quicker service availability, and provides more experienced service technicians virtually on site. By using high tech video links over conventional phone lines, utilizing two-way wireless audio and visual communication in real time, technicians at the central site 14 can see exactly what the on-site technician is seeing. This allows an untrained technician or someone unfamiliar with the device to be the eyes, ears and hands of the technician at the central site. The on-site technician can then be talked through the steps of the repair process. This enhances the capabilities of existing personnel, thus reducing labor costs, service calls, and down time.

We claim:

1. A remote service system for communicating via telephone with a central service site comprising:

a service unit including a video camera, an audio speaker and a microphone adapted to be worn by a user at a remote service site, and a harness to be worn by the user supporting first local communication means coupled to the video camera, the audio speaker and the microphone for communicating audio and video via wireless signals, and a battery on the harness for powering the camera and the first local communication means; and a base unit positioned in proximity of the service unit, relative to the central service site, the base unit including a housing supporting second local communication means for communicating audio and video via wireless signals with the service unit and a video conference interface unit coupled to the second local communication means for converting audio and video signals for transmission via a telephone line to the central service site.

2. The remote service system of claim 1 wherein the service unit comprises a user headset including the audio speaker and the microphone.

3. The remote service system of claim 2 wherein the video camera is mounted to the headset.

4. The remote service system of claim 2 wherein the headset includes noise abatement earpieces.

5. The remote service system of claim 1 wherein battery is connected to the camera and first local communication means with voltage regulators.

6. The remote service system of claim 1 wherein the first local communication means comprises a video transmitter and the second local communication means comprises a video receiver.

7. The remote service system of claim 6 wherein the base unit includes an antenna connected to the video receiver.

8. The remote service system of claim 7 wherein the base unit include three antenna connected to the video receiver.

9. The remote service system of claim 8 wherein the base unit includes a mast telescopically mounting the three antenna to the base unit housing.

10. The remote service system of claim 1 wherein the first and second local communication means comprises a wireless intercom system.

11. The remote service system of claim 1 wherein the videoconference interface unit communicates with the central service site via ISDN lines.

12. The remote service system of claim 11 wherein the videoconference interface unit communicates with the central service site via three ISDN lines.

13. The remote service system of claim 1 wherein the base unit further comprise a video monitor coupled to the videoconference interface unit.

14. The remote service system of claim 1 wherein the videoconference interface unit compresses video and audio to the telephone lines.

15. The remote service system of claim 1 wherein the base unit includes external connectors on the housing for connecting the videoconference interface unit to local audio and video devices.

\* \* \* \* \*